United States Patent
Aoki et al.

(10) Patent No.: US 12,003,899 B2
(45) Date of Patent: Jun. 4, 2024

(54) INFORMATION PROCESSING APPARATUS AND INFORMATION PROCESSING METHOD

(71) Applicant: SONY GROUP CORPORATION, Tokyo (JP)

(72) Inventors: Yu Aoki, Tokyo (JP); Takuya Ikeda, Tokyo (JP); Honoka Ozaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/001,119

(22) PCT Filed: May 7, 2021

(86) PCT No.: PCT/JP2021/017433
§ 371 (c)(1),
(2) Date: Dec. 8, 2022

(87) PCT Pub. No.: WO2021/256112
PCT Pub. Date: Dec. 23, 2021

(65) Prior Publication Data
US 2023/0216997 A1   Jul. 6, 2023

(30) Foreign Application Priority Data

Jun. 17, 2020   (JP) ................ 2020-104654

(51) Int. Cl.
*G06F 3/033* (2013.01)
*G06F 3/0354* (2013.01)
(Continued)

(52) U.S. Cl.
CPC ....... *H04N 9/3188* (2013.01); *G06F 3/03542* (2013.01); *G06T 3/4007* (2013.01);
(Continued)

(58) Field of Classification Search
CPC ............... G06F 3/0325; G06F 3/03542; G06F 3/03545; G06F 3/0386; G06F 3/0425;
(Continued)

(56) References Cited

U.S. PATENT DOCUMENTS 7,055,958 B2 * 6/2006 Tajima ................ H04N 9/3185
353/69
7,405,717 B2 * 7/2008 Baba .................... G09G 3/3648
345/98
(Continued)

FOREIGN PATENT DOCUMENTS

JP     2002-108562 A       4/2002
JP     2015145890 A   *   8/2015
(Continued)

OTHER PUBLICATIONS

International Search Report and Written Opinion of PCT Application No. PCT/JP2021/017433, dated Jul. 6, 2021, 09 pages of ISRWO.

*Primary Examiner* — Joe H Cheng
(74) *Attorney, Agent, or Firm* — CHIP LAW GROUP (57) ABSTRACT

Provided is an information processing apparatus that includes a transformation matrix calculation section, a scale calculation section, and an input display generation section. The transformation matrix calculation section calculates a transformation matrix that converts the coordinates of an input position of an input device within a projection region projected from a display apparatus from the coordinates of an image coordinate system of a sensor apparatus having detected the input position to the coordinates of a screen coordinate system of the display apparatus. The scale calculation section calculates a scale correction value for a display mode of the locus of the input position in reference to distance information regarding the distance between the display apparatus and the input position. The input display
(Continued)

generation section generates an input image depicting the locus of the input position through the use of the transformation matrix and the scale correction value.

10 Claims, 10 Drawing Sheets

(51) Int. Cl.
 *G06T 3/4007* (2024.01)
 *G06T 7/70* (2017.01)
 *H04N 9/31* (2006.01)
(52) U.S. Cl.
 CPC ...... *G06T 7/70* (2017.01); *G06T 2207/10012* (2013.01); *G06T 2207/10048* (2013.01)
(58) Field of Classification Search
 CPC ....... G06F 3/0484; G06F 3/0488; G09G 5/00; H04N 9/3188; G06T 3/40; G06T 7/70; G06T 7/80; G06T 2207/10048; G06T 2207/30204
 See application file for complete search history.

(56) References Cited

U.S. PATENT DOCUMENTS

| | | | | |
|---|---|---|---|---|
| 7,486,281 | B2* | 2/2009 | Kobayashi | G06F 3/0433 345/173 |
| 8,251,524 | B2* | 8/2012 | Furui | H04N 9/3194 353/121 |
| 8,322,862 | B2* | 12/2012 | Nara | H04N 9/3185 348/222.1 |
| 8,491,128 | B2* | 7/2013 | Wu | H04N 9/3185 353/69 |
| 9,672,602 | B2* | 6/2017 | Hara | H04N 9/3194 |
| 10,104,351 | B2* | 10/2018 | Muramatsu | H04N 9/3185 |
| 2002/0015137 | A1* | 2/2002 | Hasegawa | G03B 17/54 353/42 |
| 2002/0130850 | A1* | 9/2002 | Kobayashi | G06F 3/0346 345/180 |
| 2019/0163289 | A1* | 5/2019 | Takano | G06F 3/0425 |
| 2021/0390927 | A1* | 12/2021 | Aoki | G06F 3/042 |

FOREIGN PATENT DOCUMENTS

| | | |
|---|---|---|
| JP | 2017-107084 A | 6/2017 |
| JP | 2017-227716 A | 12/2017 |
| JP | 2019-096098 A | 6/2019 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/017433 filed on May 7, 2021, which claims priority benefit of Japanese Patent Application No. JP 2020-104654 filed in the Japan Patent Office on Jun. 17, 2020. Each of the above-referenced applications is hereby incorporated herein by reference in its entirety.

TECHNICAL FIELD

The present disclosure relates to an information processing apparatus, an information processing method, and a program.

BACKGROUND ART

In recent years, research and development has been conducted on equipment for presenting information by projection and performing an operation through the use of a projection plane and on a projection AR (Augmented Reality) technology for augmenting a real space through the use of projection mapping.

A projector, which is one example of the above-mentioned equipment, has been formerly installed at a fixed location in, for example, a conference room. However, studies are now conducted on a projector that is capable of being driven to dynamically change a projection direction. Such a projector is able to provide projection in a desired direction within an installation space.

Further, an interactive projector capable of performing an input operation relative to a projection region with a pen-type input device has been put to practical use. The interactive projector detects an input position by using, for example, an infrared camera to capture an image of bright spots of infrared light outputted from the input device. Coordinates of the input position identified by an image coordinate system of the infrared camera are converted to the coordinates in a screen coordinate system of the interactive projector.

CITATION LIST

Patent Literature

[PTL 1]
Japanese Patent Laid-open No. 2017-227716

SUMMARY

Technical Problem

In a case where a display apparatus, such as the interactive projector, displays the input locus of the input device, the resulting input image usually contains, for example, fine lines and letters. Further, there is rarely an ideal projection plane where the distance from the display apparatus remains constant within the whole projection region. Therefore, the distance to the display apparatus often varies within the projection region. Consequently, because of the above-mentioned distance, the image quality of the input image may not be made consistent simply by converting the coordinates of the input position detected by the coordinate system of the camera to the screen coordinates of the display apparatus.

The present disclosure provides an information processing apparatus, an information processing method, and a program that are able to provide consistent image quality even if the distance from the display apparatus varies within the projection region.

Solution to Problem

An information processing apparatus according to an embodiment of the present disclosure includes a transformation matrix calculation section, a scale calculation section, and an input display generation section. The transformation matrix calculation section calculates a transformation matrix for converting the coordinates of an input position of an input device within a projection region projected from a display apparatus from the coordinates of an image coordinate system of a sensor apparatus having detected the input position to the coordinates of a screen coordinate system of the display apparatus. The scale calculation section calculates a scale correction value for a display mode of the locus of the input position in reference to distance information regarding the distance between the display apparatus and the input position. The input display generation section generates an input image depicting the locus of the input position through the use of the transformation matrix and the scale correction value.

Further, the information processing apparatus may additionally include a content display generation section and a control section. The content display generation section generates a content image to be displayed in the projection region together with the input image by the display apparatus. The control section combines the input image with the content image.

Further, the scale correction value may be a correction value for thickness, lightness, or saturation of the locus or for contrast of a contour.

Moreover, the lower-limit value of the above-mentioned thickness may be preset according to the distance.

Additionally, in a case where the input device is a pen device that displays the input position with infrared light, the sensor apparatus is an infrared stereo camera that is mounted on the display apparatus to detect the input position and the distance, and the information processing apparatus additionally includes a reference point display generation section that generates a reference point image depicting at least four reference points displayed in the projection region by the display apparatus, the transformation matrix calculation section may calculate the transformation matrix according to the reference point image and an infrared image that is detected by the infrared stereo camera and depicted by the infrared light whose reference points are outputted from the pen device, and the scale calculation section may calculate the scale correction value for each of the reference points.

Further, the scale calculation section may perform linear interpolation to calculate the distance from the display apparatus to a pixel between the reference points within the reference point image, and calculate the scale correction value for the pixel according to the calculated distance.

Further, the information processing apparatus may additionally include an input coordinate detection section that extracts a drawing region of the infrared light from the infrared image and detects the centroid of the drawing region as position coordinates of the reference points.

Moreover, after each change in a projection direction of the display apparatus, the transformation matrix calculation section may calculate the transformation matrix, and the scale calculation section may calculate the scale correction value.

In an information processing method according to an embodiment of the present disclosure, the method calculates a transformation matrix that converts the coordinates of an input position of an input device within a projection region projected from a display apparatus from the coordinates of an image coordinate system of a sensor apparatus having detected the input position to the coordinates of a screen coordinate system of the display apparatus. The method calculates a scale correction value for a display mode of the locus of the input position in reference to distance information regarding the distance between the display apparatus and the input position. Then, the method generates an input image depicting the locus of the input position through the use of the transformation matrix and the scale correction value.

A program according to an embodiment of the present disclosure is executed by a computer communicatively connected to each of an input device, a display apparatus, and a sensor apparatus. The program calculates a transformation matrix that converts the coordinates of an input position of the input device within a projection region projected from the display apparatus from the coordinates of an image coordinate system of the sensor apparatus having detected the input position to the coordinates of a screen coordinate system of the display apparatus. Then, the program calculates a scale correction value for a display mode of the locus of the input position in reference to distance information regarding the distance between the display apparatus and the input position. The program generates an input image depicting the locus of the input position through the use of the transformation matrix and the scale correction value.

DESCRIPTION OF EMBODIMENTS

Embodiments of an information processing system will now be described with reference to the accompanying drawings. The following description mainly deals with major component elements of the information processing system. However, undepicted or undescribed component elements and functions may exist in the information processing system. The description given below does not exclude the undepicted or undescribed component elements and functions.

First Embodiment

Figure 1:
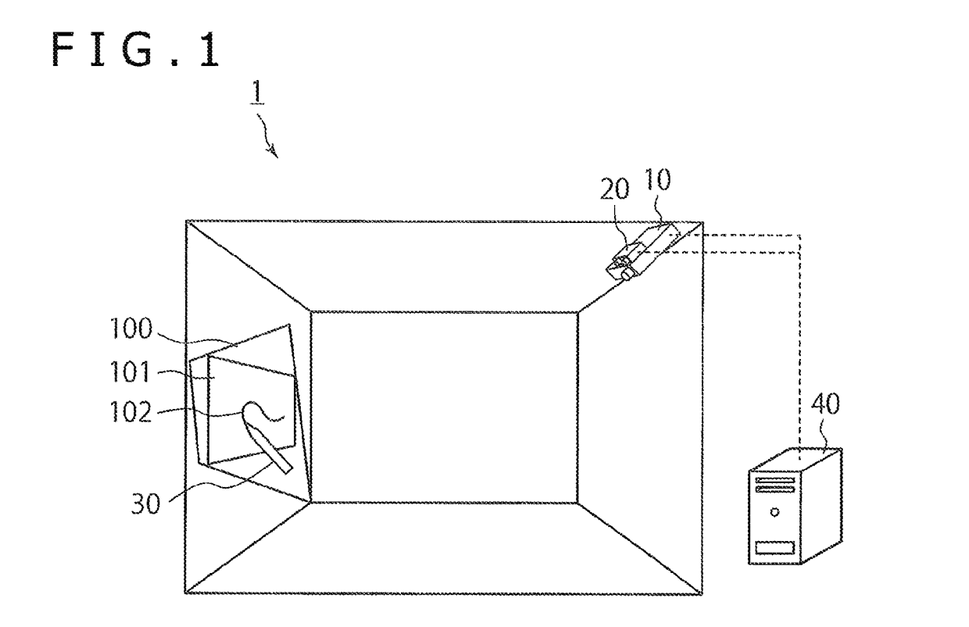
FIG. 1 is a schematic cross-sectional view illustrating an information processing apparatus according to a first embodiment.

FIG. 1 is a schematic diagram illustrating a configuration of the information processing system according to a first embodiment. The information processing system 1 depicted in FIG. 1 includes a projector 10, an infrared stereo camera 20, a pen device 30, and an information processing apparatus 40. The projector 10, the infrared stereo camera 20, and the pen device 30 are communicatively connected to the information processing apparatus 40. In the present embodiment, the pen device 30 is connected to the information processing apparatus 40 by wireless communication.

The projector 10, which is an example of a display apparatus, is fixed, for example, to an indoor wall surface in such a manner as to be able to provide projection. The projector 10 is an interactive projector that is able to display a content image 101 and an input image 102 in a projection region 100. The content image 101 is, for example, an image created by the information processing apparatus 40, whereas the input image 102 is an image depicting the locus of an input position of the pen device 30 within the projection region 100.

The infrared stereo camera 20, which is an example of a sensor apparatus, is mounted on the top of the projector 10 in such a manner as to be able to capture an image of the projection region 100. The infrared stereo camera 20 not only detects bright spots of infrared light of the pen device 30 within the projection region 100, but also measures the distance to the detected bright spots. In order to measure the distance to the bright spots, the infrared stereo camera 20 includes a plurality of imaging elements. The distance measured by the infrared stereo camera 20 corresponds to the distance between the projector 10 and the input position of the pen device 30. It should be noted that internal parameters and lens distortion coefficients of the projector 10 and the infrared stereo camera 20 are assumed to be known.

Figure 2:
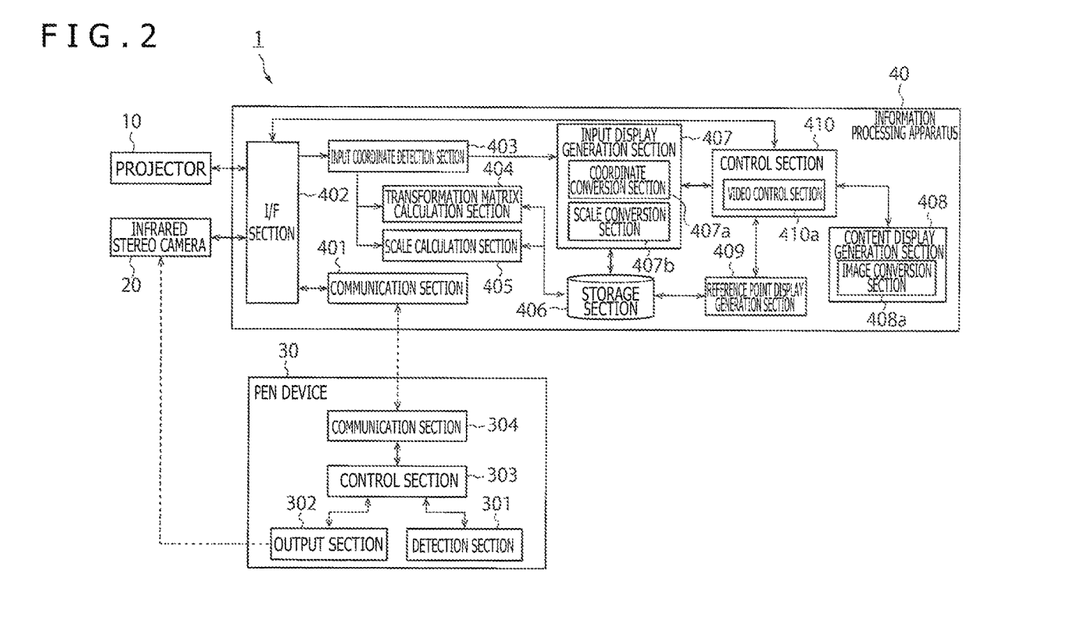
FIG. 2 is a block diagram illustrating a pen device and the information processing apparatus.

FIG. 2 is a block diagram illustrating the pen device 30 and the information processing apparatus 40.

The pen device 30 includes a detection section 301, an output section 302, a control section 303, and a communication section 304. The detection section 301 includes a switch that detects the tip of the pen device 30 when the tip is pressed against a projection plane. The output section 302 includes a light source that outputs infrared light. The control section 303 controls the operations of various sections of the pen device 30. The communication section 304 wirelessly communicates with the information processing apparatus 40 under the control of the control section 303.

The pen device 30 is configured such that, when the detection section 301 detects a pressure applied by the tip of the pen device 30, the control section 303 causes the output section 302 to output infrared light and simultaneously causes the communication section 304 to transmit identification information regarding the pen device 30 to the information processing apparatus 40.

The information processing apparatus 40 includes a communication section 401, an I/F section 402, an input coordinate detection section 403, a transformation matrix calculation section 404, a scale calculation section 405, a storage section 406, an input display generation section 407, a content display generation section 408, a reference point display generation section 409, and a control section 410.

The communication section 304 wirelessly communicates with the communication section 304 of the pen device 30. More specifically, the communication section 304 receives the identification information regarding the pen device 30, which is transmitted from the communication section 304. The identification information regarding the pen device 30 is reported to the input coordinate detection section 403 through the I/F section 402.

The I/F section 402 functions as an interface that communicates information with the projector 10 and the infrared stereo camera 20.

The input coordinate detection section 403 detects the positions of infrared bright spots from an image captured by the infrared stereo camera 20, and identifies the detected positions as the input coordinates of the pen device 30 in association with the above-mentioned identification information. Further, the input coordinate detection section 403 acquires distance information which is measured by the infrared stereo camera 20 through the I/F section 402.

The transformation matrix calculation section 404 calculates a transformation matrix in reference to a reference point image created by the reference point display generation section 409, and stores the calculated transformation matrix in the storage section 406. The transformation matrix is used for converting the input coordinates identified in the reference point image by the input coordinate detection section 403 from the coordinates of an image coordinate system of the infrared stereo camera 20 to the coordinates of a screen coordinate system of the projector 10. It should be noted that the screen coordinate system is a coordinate system of a projection image projected onto the projection region 100 by the projector 10.

When the above-mentioned reference point image is displayed, on the basis of the distance information inputted to the input coordinate detection section 403, the scale calculation section 405 calculates a scale correction value regarding a display mode of the input image 102 with respect to each pixel of the projection image in the projection region 100. Further, the scale calculation section 405 creates a correction table that indicates the association between the calculated scale correction value and each pixel of the projection image, and stores the created correction table in the storage section 406. In the present embodiment, the scale correction value is a correction value for the thickness of a line segment in the input image 102.

The storage section 406 stores various kinds of information and programs in addition to the above-mentioned transformation matrix and correction table.

The input display generation section 407 includes a coordinate conversion section 407a and a scale conversion section 407b. The coordinate conversion section 407a converts the input coordinates identified by the input coordinate detection section 403 to the coordinates of the screen coordinate system by using the transformation matrix stored in the storage section 406. The scale conversion section 407b references the correction table stored in the storage section 406, to determine the scale correction value for the input coordinates. The input image 102 is generated by the above-described drawing process.

The content display generation section 408 includes an image conversion section 408a. The image conversion section 408a converts the coordinates of an image created by application software to the coordinates of the screen coordinate system. The content image 101 is created by the above-described drawing process.

The reference point display generation section 409 generates the reference point image based on image information pre-stored in the storage section 406. The reference point image is now described below with reference to FIG. 3.

Figure 3:
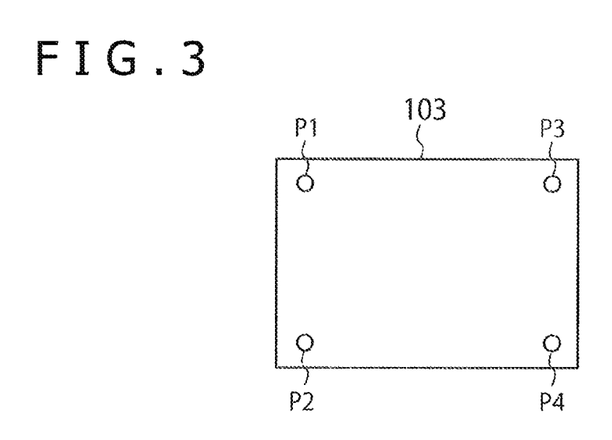
FIG. 3 is a diagram illustrating an example of a reference point image.

FIG. 3 is a diagram illustrating an example of the reference point image. In the reference point image 103 illustrated in FIG. 3, four reference points P1 to P4 are depicted. At least four reference points are required to calculate the above-mentioned transformation matrix. Further, although, in the reference point image 103, the reference points are disposed at the corners of the reference point image 103, the positions of the reference points are not particularly limited to any place.

The control section 410 includes a video control section 410a. The video control section 410a combines the input image 102 created by the input display generation section 407 with the content image 101 created by the content display generation section 408, and causes the projector 10 to display the resulting combined image in the projection region 100. Further, the video control section 410a causes the projector 10 to display the reference point image 103 independently in the projection region 100. It should be noted that the control section 410 has a function of controlling the operations of various sections in the information processing apparatus 40 in addition to the function of the video control section 410a.

Operations performed by the above-described information processing system 1 will now be described.

A process of calculating the transformation matrix and the scale correction value is firstly described below.

Figure 4:
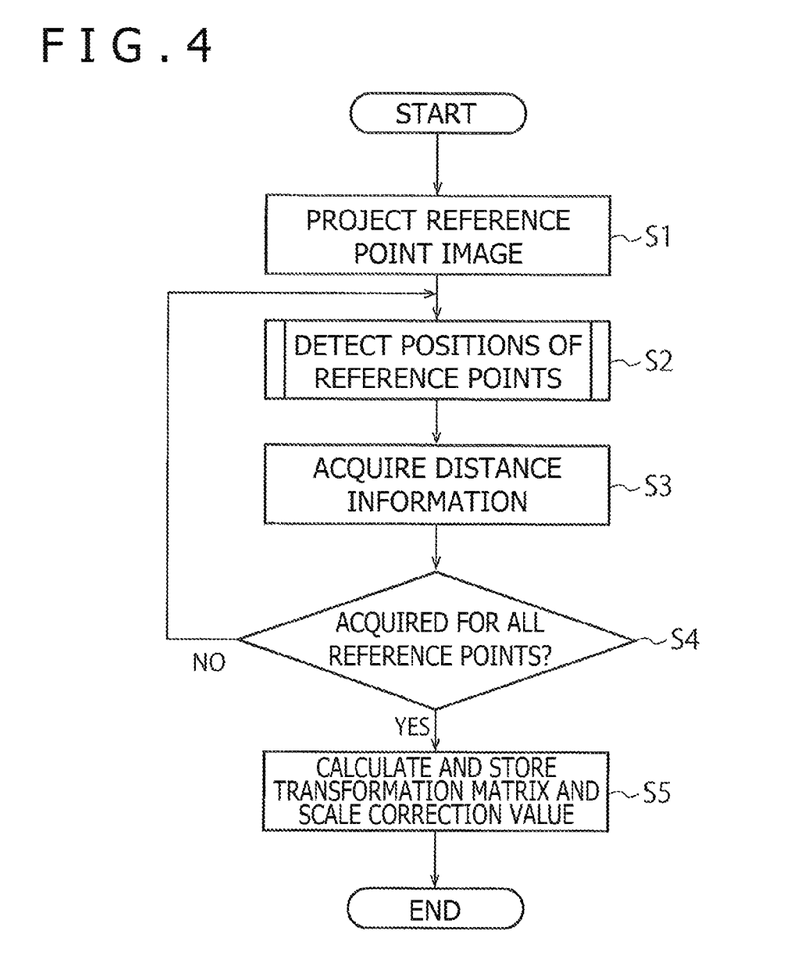
FIG. 4 is a flowchart illustrating a process of calculating a transformation matrix and a scale correction value.

FIG. 4 is a flowchart illustrating the process of calculating the transformation matrix and the scale correction value. First of all, the control section 410 of the information processing apparatus 40 causes the projector 10 to project the reference point image 103 onto the projection region 100 (step S1).

Next, the input coordinate detection section 403 of the information processing apparatus 40 detects the positions of the reference points depicted in the reference point image 103 (step S2). The operation performed in step S2 is described in detail below.

Figure 5:
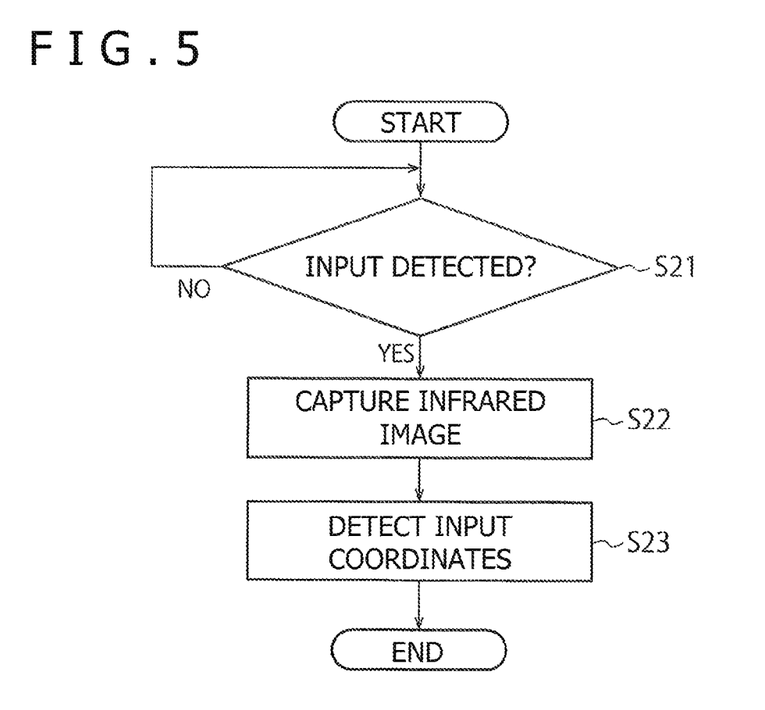
FIG. 5 is a flowchart illustrating a process of detecting the positions of reference points.

FIG. 5 is a flowchart illustrating a process of detecting the positions of the reference points. When the reference point image 103 is projected, the information processing apparatus 40 detects whether or not an input operation is performed by the pen device 30 (step S21). The operation performed in step S21 will now be described in detail below.

Figure 6:
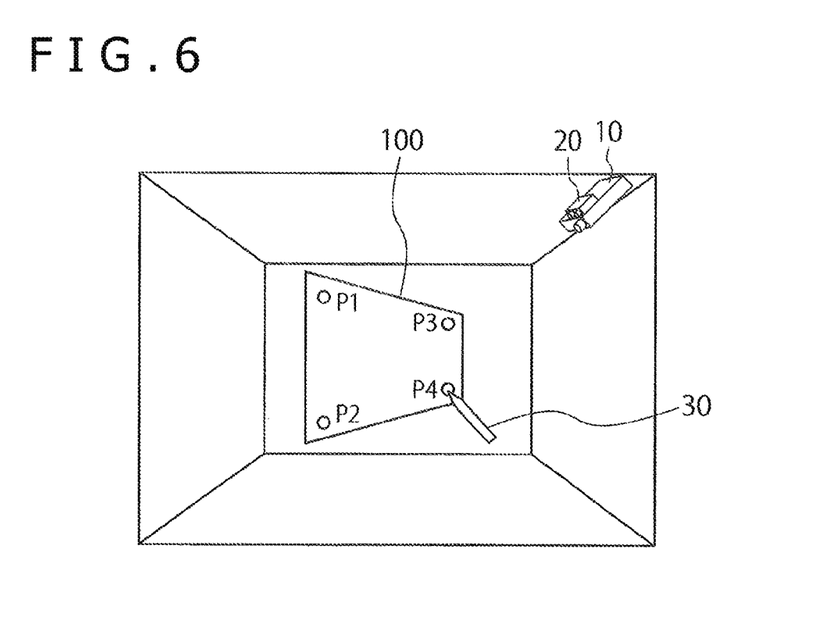
FIG. 6 is a schematic diagram illustrating the reference point image projected onto a projection region.

FIG. 6 is a schematic diagram illustrating the reference point image 103 projected onto the projection region 100. As depicted in FIG. 6, when the tip of the pen device 30 is pressed against any one of the reference points P1 to P4, the output section 302 of the pen device 30 outputs infrared light, and at the same time, the communication section 304 transmits the identification information. When the communication section 401 of the information processing apparatus 40 receives the identification information, it is determined that the input operation is performed by the pen device 30. Step S21 is performed in the manner described above.

Returning to the flowchart of FIG. 5, when the input operation performed by the pen device 30 is confirmed, the control section 410 of the information processing apparatus 40 instructs the infrared stereo camera 20 to capture an infrared image that depicts any one of the reference points P1 to P4 as an infrared bright spot (step S22). The captured infrared image is inputted to the input coordinate detection section 403 through the I/F section 402 of the information processing apparatus 40.

Figure 7:
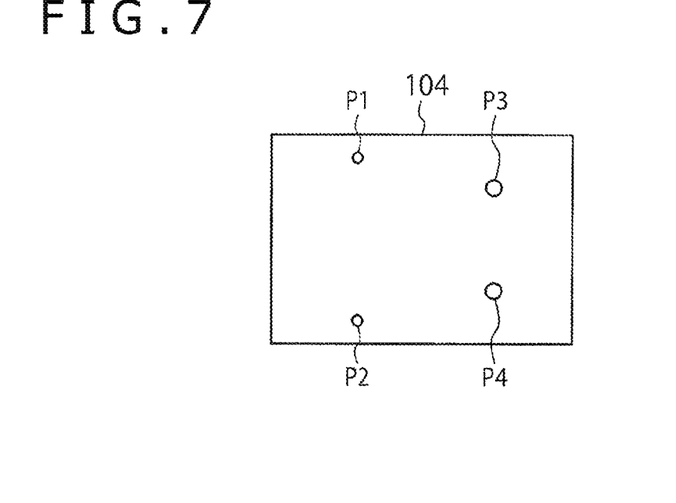
FIG. 7 is a diagram illustrating an example of an infrared image.

FIG. 7 is a diagram illustrating an example of the infrared image. In FIG. 7, all the four reference points P1 to P4 are depicted as the infrared bright spots. In reality, however, the reference points P1 to P4 are depicted on the basis of individual reference points. That is, an infrared image 104 depicted in FIG. 7 is an aggregate of four sets of infrared images.

Returning to the flowchart of FIG. 5, when the infrared image 104 is captured, the input coordinate detection section 403 detects the input coordinates of the infrared bright spots (step S23). More specifically, the input coordinate detection section 403 performs a binarization process on each pixel by comparing each pixel value of the infrared image 104 with a preset threshold. Subsequently, the input coordinate detection section 403 extracts the drawing region of infrared light from a group of binarized pixels. Eventually, the input coordinate detection section 403 calculates the coordinates of a centroid pixel in the drawing region as the input coordinates.

Returning to the flowchart of FIG. 4, after detecting the positions of the reference points depicted in the reference point image 103, the input coordinate detection section 403 acquires the distance information regarding the distance between the reference points and the projector 10 (step S3). The distance information is measured by the infrared stereo camera 20 and is inputted to the input coordinate detection section 403 through the I/F section 402.

Steps S2 and S3, which have been described above, are repeated until the input coordinate detection section 403 achieves input coordinate detection and distance information acquisition for all the reference points P1 to P4 (step S4).

When input coordinate detection and distance information acquisition are completed for all the reference points P1 to P4, the transformation matrix calculation section 404 calculates the transformation matrix, and the scale calculation section 405 calculates the scale correction value (step S5). The transformation matrix calculation section 404 calculates the transformation matrix such that the input coordinates detected in the coordinate system of the infrared image can be converted to the coordinates of the reference points P1 to P4 in the coordinate system of the reference point image 103. The transformation matrix and the scale correction value are stored in the storage section 406.

Figure 8:
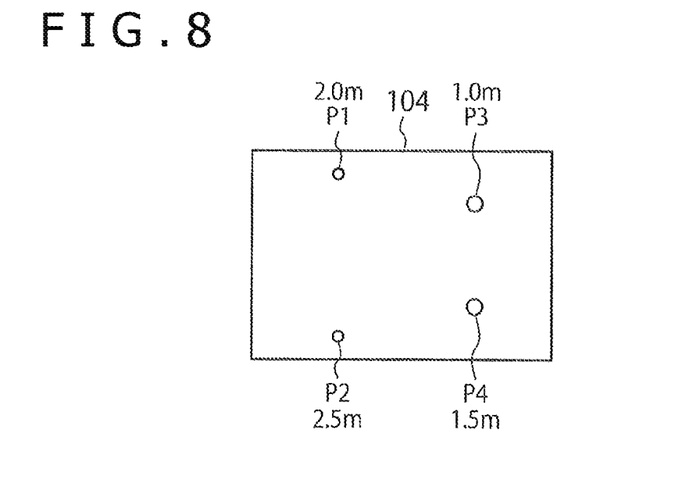
FIG. 8 illustrates an example of a distance value of each reference point that is measured on the basis of the infrared image.
Figure 9:
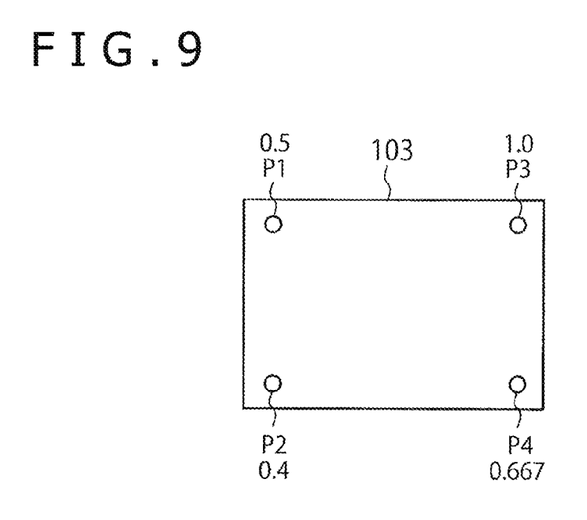
FIG. 9 illustrates an example of the scale correction value for each reference point in the reference point image.

FIG. 8 illustrates an example of a distance value of each reference point that is measured on the basis of the infrared image 104. Meanwhile, FIG. 9 illustrates an example of the scale correction value for each reference point in the reference point image 103. As depicted in FIG. 8, the positional relation with the projector 10 indicates that the reference point P3 is nearest to the projector 10 and that the reference point P2 is farthest from the projector 10. Consequently, as depicted in FIG. 9, the scale correction value decreases with an increase in the distance to the projector 10 such that, for example, equal values are obtained by multiplying the scale correction values by the distance values of the reference points P1 to P4.

It should be noted that the reference point image 103 may be a pattern image such as a grid. In this case, a visible light camera may be used instead of the infrared stereo camera 20 to detect grid intersection coordinates as the input coordinates. Further, the transformation matrix calculation section 404 calculates the transformation matrix that converts such intersection coordinates from the coordinates of the image coordinate system of the visible light camera to the coordinates of the coordinate system of the reference point image 103.

Further, a depth sensor may be used instead of the infrared stereo camera 20 to measure the distance to the infrared bright spots depicted in the projection region 100. Alternatively, the distance may be measured by calculating the area of the drawing region because the area of the drawing region of the infrared bright spots varies according to the distance. In a case where such an alternative scheme is adopted, the distance measurement function, for example, of the infrared stereo camera 20 is not necessary.

Moreover, the scale calculation section 405 may perform linear interpolation to calculate the distance from the projector 10 to each pixel among the reference points P1 to P4 within the reference point image 103. The reason is that allowing the infrared stereo camera 20 to successively measure the distance between the projector 10 and each pixel may reduce distance accuracy due, for instance, to noise such as external light.

Following the above description of the process of calculating the transformation matrix and the scale correction value, a process of displaying the content image 101 and the input image 102 will now be described.

Figure 10:
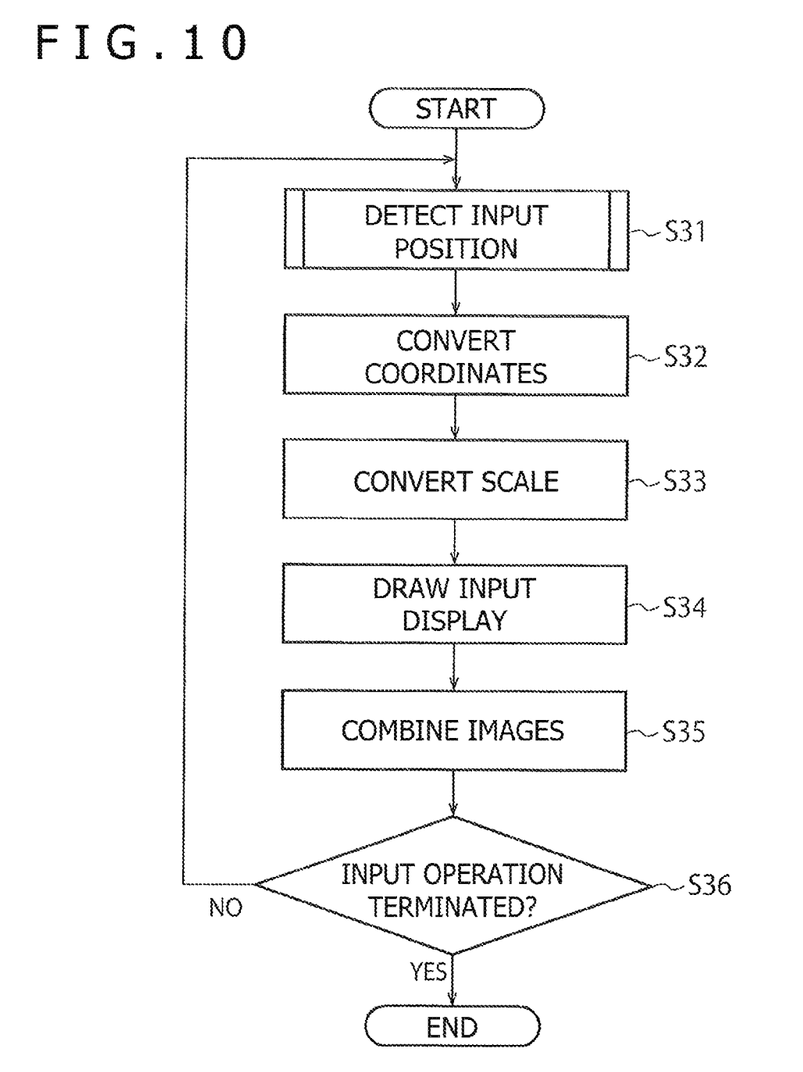
FIG. 10 is a flowchart illustrating a process of displaying a content image and an input image.

FIG. 10 is a flowchart illustrating the process of displaying the content image 101 and the input image 102.

First of all, the input coordinate detection section 403 of the information processing apparatus 40 detects the coordinates of the input position of the pen device 30 within the projection region 100 (step S31). In step S31, as is the case with the above-described step S23 (see FIG. 5), the coordinates of the input position are identified by performing the binarization process, a region extraction process, and a centroid coordinate calculation process on the image captured by the infrared stereo camera 20.

Next, the coordinate conversion section 407*a* of the input display generation section 407 converts the coordinates of the input position which are identified in the coordinate system of the infrared stereo camera 20 to the coordinates of the screen coordinate system of the projector 10 by using the transformation matrix calculated in the above-described step S5 (see FIG. 4) (step S32).

Next, the scale conversion section 407*b* of the input display generation section 407 converts the scale of the line segment in the input image 102, by using the scale correction value calculated in the above-described step S5 (see FIG. 4) (step S33). In step S33, the thickness of the line segment is converted with use of the scale correction value corresponding to a pixel having the input coordinates. The line segment, which is scale-converted as described above, is depicted in the input image 102 (step S34).

Next, the video control section 410*a* of the control section 410 combines the input image 102 with the content image 101, which is generated by the content display generation section 408 (step S35). The resulting combined image is displayed in the projection region 100 by the projector 10.

The above-described steps S31 to S35 are repeated until the input operation of the pen device 30 terminates (step S36).

In the above-described image display process, the content image 101 and the input image 102 are combined and displayed in the projection region 100. However, only the input image 102 may be displayed.

Figure 11:
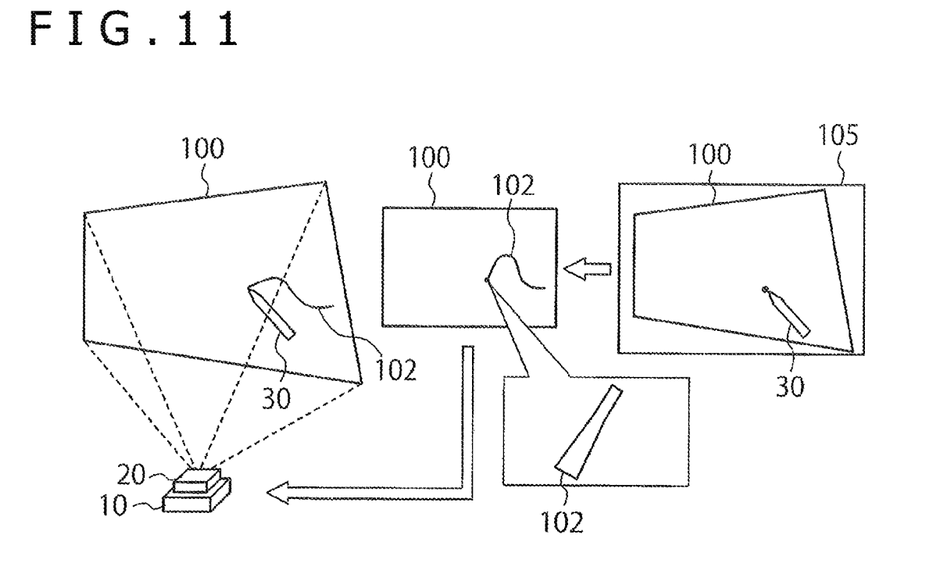
FIG. 11 is a schematic drawing illustrating a process of generating and displaying the input image.

FIG. 11 is a schematic drawing illustrating a process of generating and displaying the input image 102.

If, for example, a drawing process for input display of the pen device 30 is performed in the image coordinate system 105 of the infrared stereo camera 20 in order to achieve conversion to the screen coordinate system, image quality degradation may occur because the two coordinate systems differ in the number of pixels.

In order to avoid image quality degradation, the present embodiment converts only the coordinate values of the input position of the pen device 30 to the coordinate values of the screen coordinate system as depicted in the right part of FIG. 11. Subsequently, a drawing process is performed to depict the locus of the input position of the pen device 30 in the screen coordinate system 106 as depicted in the central part of FIG. 11. However, in a case where the drawing process is performed in the screen coordinate system 106, the projected input image 102 may become enlarged in accordance with the distance from the projector 10 at the time of projection.

Accordingly, the present embodiment performs a scale correction process of correcting the thickness of the line segment (the locus of the input position) in the input image 102 by using the correction table that contains the scale correction value calculated for each pixel in the screen coordinate system 106. The scale correction process linearly changes the thickness according to the scale correction values for pixels to which, for example, the coordinates of starting and ending points of the line segment to be drawn belong.

It should be noted that the scale correction may be made by using not only the scale correction values for the starting and ending points of the line segment but also the scale correction values for pixels to which the coordinates passed through by the line segment belong.

Further, the target of scale correction is not limited to line segment thickness. For example, in a case where there is a long projection distance between the projector 10 and the projection region 100, the brightness of the projection region 100 decreases. In such a case, the scale conversion section 407b may make color correction for correcting the saturation and lightness of the input locus according to the scale correction values. Similarly, on the basis of the scale correction values, the scale conversion section 407b may change the intensity of sharpness processing of the input locus, that is, the magnitude of contrast of the contour of the input locus.

Further, if the input locus positioned far from the projector 10 is simply scale-corrected, the line segment of the input locus may become excessively thin, so that drawing is unachievable at the resolution of the projection image. To avoid such a problem, the thickness of the line segment of the input locus may be limited by presetting the lower limit of the scale correction value according to the distance from the projector 10.

Moreover, in a situation where the transformation matrix is calculated by the transformation matrix calculation section 404, the pixels in the image coordinate system 105 of the infrared stereo camera 20 are already associated with the pixels in the screen coordinate system 106 of the projector 10. Therefore, the scale conversion section 407b may perform the scale correction process while acquiring the distance information from the infrared stereo camera 20 at the time of input from the pen device 30.

Additionally, the scale conversion section 407b may correct the values in the correction table, which contains the scale correction values stored in the storage section 406, by using the scale correction value calculated on the basis of the distance information acquired during input from the pen device 30.

The present embodiment, which has been described above, corrects the display mode of the input image inputted from the pen device 30, by using the scale correction value calculated on the basis of the distance to the projector 10. Therefore, the input image of consistent image quality can be displayed on various projection planes positioned at different distances.

Further, the present embodiment creates the content image 101 and the input image 102 by performing separate drawing processes. Therefore, the present embodiment is able to display the input image 102 of consistent image quality while supplying the content image 101 of high image quality.

Second Embodiment

Figure 12:
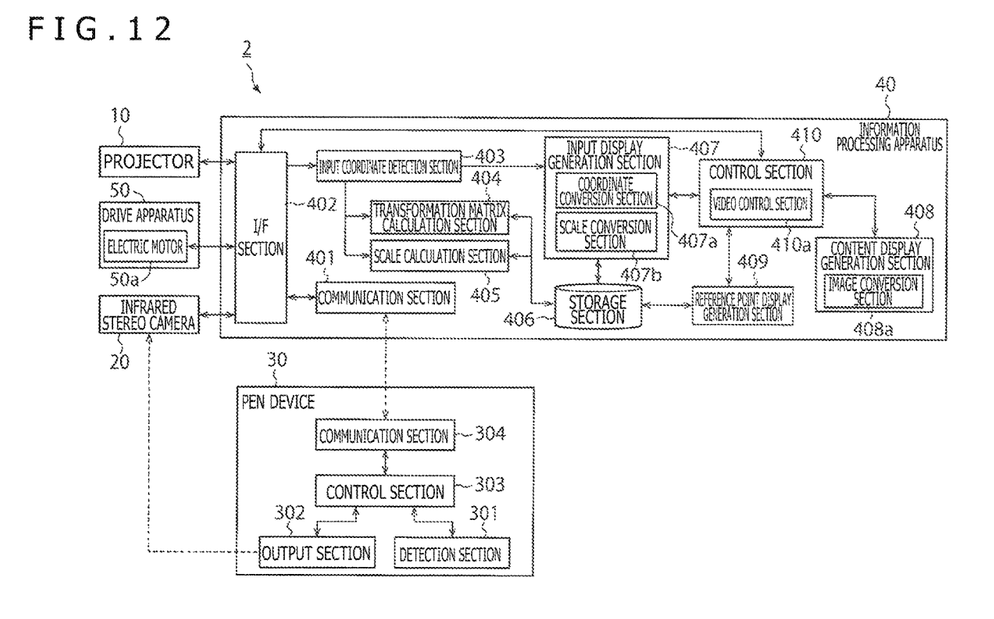
FIG. 12 is a block diagram illustrating a configuration of an information processing system according to a second embodiment.

FIG. 12 is a block diagram illustrating a configuration of the information processing system according to a second embodiment. Component elements similar to the component elements in the first embodiment, which has been described thus far, are designated by the same reference signs as the corresponding component elements in the first embodiment and will not be redundantly described in detail.

The information processing system 2 depicted in FIG. 12 further includes a drive apparatus 50 in addition to the component elements of the information processing system 1 according to the first embodiment. The drive apparatus 50 includes an electric motor 50a that is connected to the projector 10. When the electric motor 50a rotates under the control of the control section 410 of the information processing apparatus 40, the direction of the optical axis of the projector 10 changes to change a projection direction. In this instance, the infrared stereo camera 20 rotationally transfers similarly to the projector 10, and is thus able to capture an image displayed in the changed projection direction.

Each time the projection direction of the projector 10 is changed, the projector 10 displays the reference point image 103, which is described in conjunction with the first embodiment. Subsequently, in the information processing apparatus 40, the transformation matrix calculation section 404 calculates the transformation matrix based on the reference point image 103 captured by the infrared stereo camera 20, and the scale calculation section 405 calculates the scale correction value according to the distance information measured by the infrared stereo camera 20.

Consequently, even if the projection direction is changed, the present embodiment is able to project an input image suitable for the changed projection direction.

It should be noted that, in the first and second embodiments, which have been described above, the projector 10, the infrared stereo camera 20, and the information processing apparatus 40 are configured as independent equipment. However, at least two of these three pieces of equipment may be integral with each other.

Further, the processes to be performed by the information processing apparatus 40 according to the foregoing embodiments may be implemented by software (program) that is executed, for example, by a CPU (Central Processing Unit)

or a GPU (Graphics Processing Unit). It should be noted that all the processes to be performed by the information processing apparatus 40 need not be executed by the software. Some of the processes may be executed by hardware such as a dedicated circuit. Further, the program may be stored on a non-transitory recording medium such as a flexible disk, a magnetic disk, or an optical disk, and may then be read and executed by a computer. The recording medium is not limited to a removable medium such as a magnetic disk or an optical disk. A fixed recording medium such as a solid-state drive apparatus, a hard disk apparatus, or a memory element may be used alternatively.

Moreover, the foregoing embodiments represent an example for embodying the present disclosure, so that the present disclosure can be implemented by various other embodiments. For example, various modifications, replacements, omissions, or combinations of such changes may be made without departing from the spirit and scope of the present disclosure. Embodiments obtained, for example, by making such modifications, replacements, or omissions are also included not only within the scope of the present disclosure but also within the scope of the invention defined by the appended claims and within the range of equivalency of the claims.

It should be noted that the present technology can adopt the following configurations.

(1)

An information processing apparatus including:

a transformation matrix calculation section that calculates a transformation matrix for converting coordinates of an input position of an input device within a projection region projected from a display apparatus from coordinates of an image coordinate system of a sensor apparatus having detected the input position to coordinates of a screen coordinate system of the display apparatus;

a scale calculation section that calculates a scale correction value for a display mode of a locus of the input position in reference to distance information regarding a distance between the display apparatus and the input position; and an input display generation section that generates an input image depicting the locus of the input position through use of the transformation matrix and the scale correction value.

(2)

The information processing apparatus according to (1), further including:

a content display generation section that generates a content image to be displayed in the projection region together with the input image by the display apparatus; and a control section that combines the input image with the content image.

(3)

The information processing apparatus according to (1), in which the scale correction value is a correction value for thickness, lightness, or saturation of the locus or for contrast of a contour.

(4)

The information processing apparatus according to (3), in which the lower-limit value of the thickness is preset according to the distance.

(5)

The information processing apparatus according to any one of (1) to 4, further including:

a reference point display generation section that generates a reference point image depicting at least four reference points displayed in the projection region by the display apparatus, in which the input device is a pen device that displays the input position with infrared light, the sensor apparatus is an infrared stereo camera that is mounted on the display apparatus to detect the input position and the distance, the transformation matrix calculation section calculates the transformation matrix according to the reference point image and an infrared image that is detected by the infrared stereo camera and depicted by the infrared light whose reference points are outputted from the pen device, and the scale calculation section calculates the scale correction value for each of the reference points.

(6)

The information processing apparatus according to (5), in which the scale calculation section performs linear interpolation to calculate a distance from the display apparatus to a pixel between the reference points within the reference point image, and calculates the scale correction value for the pixel according to the calculated distance.

(7)

The information processing apparatus according to (5), further including:

an input coordinate detection section that extracts a drawing region of the infrared light from the infrared image and detects a centroid of the drawing region as position coordinates of the reference points.

(8)

The information processing apparatus according to any one of (1) to (7), in which, after each change in a projection direction of the display apparatus, the transformation matrix calculation section calculates the transformation matrix, and the scale calculation section calculates the scale correction value.

(9)

An information processing method including the steps of:

calculating a transformation matrix that converts coordinates of an input position of an input device within a projection region projected from a display apparatus from coordinates of an image coordinate system of a sensor apparatus having detected the input position to coordinates of a screen coordinate system of the display apparatus;

calculating a scale correction value for a display mode of a locus of the input position in reference to distance information regarding a distance between the display apparatus and the input position; and generating an input image depicting the locus of the input position through use of the transformation matrix and the scale correction value.

(10)

A program that is executed by a computer communicatively connected to each of an input device, a display apparatus, and a sensor apparatus, including the steps of:

calculating a transformation matrix that converts coordinates of an input position of the input device within a projection region projected from the display apparatus from coordinates of an image coordinate system of the sensor apparatus having detected the input position to coordinates of a screen coordinate system of the display apparatus;

calculating a scale correction value for a display mode of a locus of the input position in reference to distance information regarding a distance between the display apparatus and the input position; and generating an input image depicting the locus of the input position through use of the transformation matrix and the scale correction value.

REFERENCE SIGNS LIST

10: Projector
20: Infrared stereo camera
30: Pen device
40: Information processing apparatus
403: Input coordinate detection section
404: Transformation matrix calculation section
405: Scale calculation section
407: Input display generation section
408: Content display generation section
409: Reference point display generation section
410: Control section

The invention claimed is:

1. An information processing apparatus, comprising:
a transformation matrix calculation section configured to calculate a transformation matrix for converting coordinates of an input position of an input device within a projection region projected from a display apparatus from coordinates of an image coordinate system of a sensor apparatus having detected the input position to coordinates of a screen coordinate system of the display apparatus;
a scale calculation section configured to calculate a scale correction value for a display mode of a locus of the input position in reference to distance information regarding a distance between the display apparatus and the input position; and
an input display generation section configured to generate an input image depicting the locus of the input position through use of the transformation matrix and the scale correction value.

2. The information processing apparatus according to claim 1, further comprising:
a content display generation section configured to generate a content image to be displayed in the projection region together with the input image by the display apparatus; and
a control section configured to combine the input image with the content image.

3. The information processing apparatus according to claim 1, wherein the scale correction value is a correction value for thickness, lightness, or saturation of the locus or for contrast of a contour.

4. The information processing apparatus according to claim 3, wherein a lower-limit value of the thickness is preset according to the distance.

5. The information processing apparatus according to claim 1, further comprising a reference point display generation section configured to generate a reference point image depicting at least four reference points displayed in the projection region by the display apparatus, wherein
the input device is a pen device that displays the input position with infrared light,
the sensor apparatus is an infrared stereo camera that is mounted on the display apparatus to detect the input position and the distance,
the transformation matrix calculation section is further configured to calculate the transformation matrix according to the reference point image and an infrared image that is detected by the infrared stereo camera and depicted by the infrared light whose reference points are outputted from the pen device, and
the scale calculation section is further configured to calculate the scale correction value for each of the reference points.

6. The information processing apparatus according to claim 5, wherein the scale calculation section is further configured to:
perform linear interpolation to calculate a distance from the display apparatus to a pixel between the reference points within the reference point image; and
calculate the scale correction value for the pixel according to the calculated distance.

7. The information processing apparatus according to claim 5, further comprising an input coordinate detection section configured to:
extract a drawing region of the infrared light from the infrared image; and
detect a centroid of the drawing region as position coordinates of the reference points.

8. The information processing apparatus according to claim 1, wherein, after each change in a projection direction of the display apparatus,
the transformation matrix calculation section is further configured to
calculate the transformation matrix, and the scale calculation section is further configured to calculate the scale correction value.

9. An information processing method, comprising:
calculating a transformation matrix that converts coordinates of an input position of an input device within a projection region projected from a display apparatus from coordinates of an image coordinate system of a sensor apparatus having detected the input position to coordinates of a screen coordinate system of the display apparatus;
calculating a scale correction value for a display mode of a locus of the input position in reference to distance information regarding a distance between the display apparatus and the input position; and
generating an input image depicting the locus of the input position through use of the transformation matrix and the scale correction value.

10. A non-transitory computer-readable medium having stored thereon, computer-readable instructions which, when executed by a computer communicatively connected to each of an input device, a display apparatus, and a sensor apparatus, cause the computer to execute operations, the operations comprising:
calculating a transformation matrix that converts coordinates of an input position of the input device within a projection region projected from the display apparatus from coordinates of an image coordinate system of the sensor apparatus having detected the input position to coordinates of a screen coordinate system of the display apparatus;
calculating a scale correction value for a display mode of a locus of the input position in reference to distance information regarding a distance between the display apparatus and the input position; and
generating an input image depicting the locus of the input position through use of the transformation matrix and the scale correction value.

* * * * *